(12) United States Patent
Rastoll et al.

(10) Patent No.: US 10,942,516 B2
(45) Date of Patent: Mar. 9, 2021

(54) VEHICLE PATH UPDATES VIA REMOTE VEHICLE CONTROL

(71) Applicant: Valeo Schalter und Sensoren GmbH, Bietigheim-Bissingen (DE)

(72) Inventors: Cyril Rastoll, Palo Alto, CA (US); Jagdish Bhanushali, San Jose, CA (US); Peter Groth, Pacifica, CA (US)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 209 days.

(21) Appl. No.: 16/218,369

(22) Filed: Dec. 12, 2018

(65) Prior Publication Data
US 2020/0192351 A1    Jun. 18, 2020

(51) Int. Cl.
*G05D 1/00* (2006.01)
*G06K 9/00* (2006.01)

(52) U.S. Cl.
CPC .......... *G05D 1/0038* (2013.01); *G05D 1/0061* (2013.01); *G06K 9/00805* (2013.01); *G05D 2201/0213* (2013.01)

(58) Field of Classification Search
CPC .............. G05D 1/0038; G05D 1/0061; G05D 2201/0213; G06K 9/00805
See application file for complete search history.

(56) References Cited

U.S. PATENT DOCUMENTS

| | | | |
|---|---|---|---|
| 8,798,841 B1 * | 8/2014 | Nickolaou | B62D 15/0265 701/23 |
| 9,108,729 B2 | 8/2015 | Duggan et al. | |
| 9,429,944 B2 | 8/2016 | Filippov et al. | |
| 10,584,971 B1 * | 3/2020 | Askeland | G01C 21/30 |
| 2009/0079839 A1 * | 3/2009 | Fischer | G01S 17/86 348/218.1 |
| 2010/0106356 A1 * | 4/2010 | Trepagnier | G08G 1/16 701/25 |
| 2012/0253861 A1 | 10/2012 | Davidson et al. | |
| 2014/0067187 A1 * | 3/2014 | Ferguson | B60W 30/12 701/28 |
| 2017/0124781 A1 * | 5/2017 | Douillard | G08G 1/202 |
| 2018/0129220 A1 * | 5/2018 | Beach | G05D 1/0246 |
| 2019/0163176 A1 * | 5/2019 | Wang | G05D 1/0061 |
| 2019/0212725 A1 * | 7/2019 | Woodrow | G08G 1/22 |
| 2019/0265045 A1 * | 8/2019 | Baik | G01C 21/32 |

\* cited by examiner

*Primary Examiner* — Calvin Cheung
(74) *Attorney, Agent, or Firm* — Oblon, McClelland, Maier & Neustadt, L.L.P.

(57) ABSTRACT

The present disclosure relates to a method, apparatus, and computer-readable storage medium for trajectory update using remote vehicle control. According to an embodiment, the above-described method, apparatus, and computer-readable storage medium of the present disclosure generally relate to identifying an obstacle blocking at least a portion of a road based on data received from one or more vehicle sensors, determining whether a path trajectory cannot be found to operate the vehicle with respect to the identified obstacle while the vehicle is operating in autonomous mode, sending, upon determination that the path trajectory cannot be found, a request to a remote controller to navigate the vehicle, operating the vehicle in remotely controlled mode, based upon instructions received from the remote controller, wherein a movement trajectory of the vehicle is recorded while being operated in the remotely controlled mode, and updating a navigational map based at least on the recorded movement trajectory.

20 Claims, 12 Drawing Sheets

VEHICLE PATH UPDATES VIA REMOTE VEHICLE CONTROL

BACKGROUND

Autonomous vehicles (Society of Automotive Engineers (SAE) Level 4 and 5) can operate without driver intervention. These vehicles are designed to be able to handle any situation that may occur within a specific operational design domain, defined by the system manufacturer. However, autonomous vehicles are, at times, confronted with unknown or unexpected situations that fall outside the specific operational design domain. These situations may result from significant changes to infrastructure or obstacles including a working zone, automotive collisions, accidents, law enforcement activities, or fallen trees, among others. In these instances, the autonomous vehicle may not comprehend the situation at hand and, therefore, may not be able to determine an appropriate trajectory for navigating around the impediment.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a method, apparatus, and computer-readable storage medium for trajectory update using remote vehicle control.

According to an embodiment, the above-described method, apparatus, and computer-readable storage medium of the present disclosure generally relate to identifying an obstacle blocking at least a portion of a road based on data received from one or more vehicle sensors, determining whether a path trajectory cannot be found to operate the vehicle with respect to the identified obstacle while the vehicle is operating in autonomous mode, sending, upon determination that the path trajectory cannot be found, a request to a remote controller to navigate the vehicle, operating the vehicle in remotely controlled mode, based upon instructions received from the remote controller, wherein a movement trajectory of the vehicle is recorded while being operated in the remotely controlled mode, and updating a navigational map based at least on the recorded movement trajectory.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
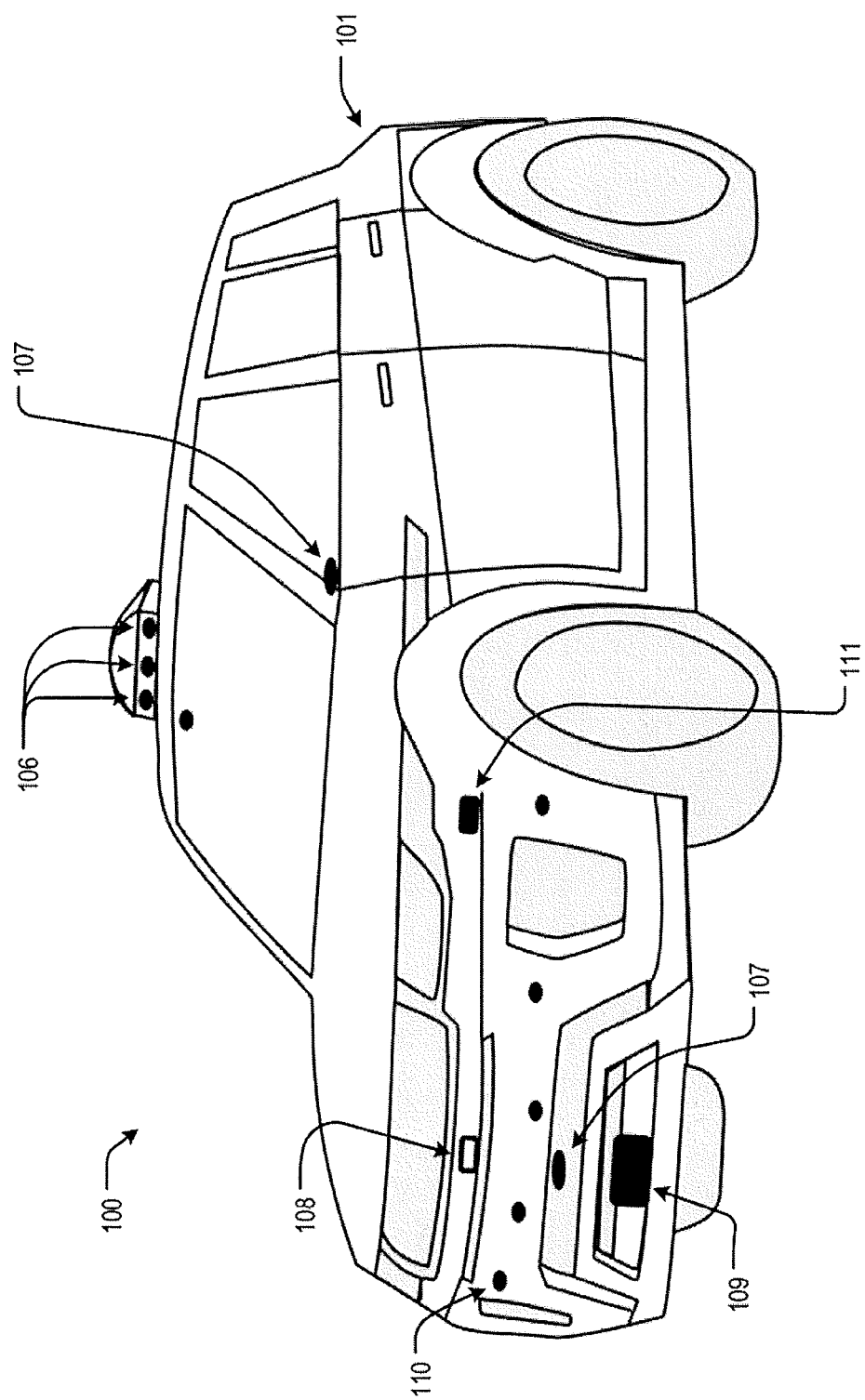
FIG. 1 is an illustration of an autonomous vehicle, according to an exemplary embodiment of the present disclosure.

The tends "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The terms "obstacle" and "impediment" may be used interchangeably, as appropriate, throughout this application. Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

As mentioned earlier, autonomous vehicles (AVs) are designed to be able to handle situations that may occur within a specific operational design domain. However, these vehicles are, at times, confronted with unknown or unexpected situations that fall outside the specific operational design domain. These situations may result from temporary changes to the environment such as working zones, automotive collisions, accidents, law enforcement activities, or fallen trees, among others. The term "impediment" or "obstacle" is used herein to refer to any temporary changes in the environment resulting in a blockage in the road that cannot be handled by the AV. In general, an AV may not be able to handle a situation or an impediment when a confidence level on a decision made by the AV is less than a predetermined threshold. In one example, if the AV receives conflicting signals from one or more sensors, or when a new trajectory violates one or more traffic laws, etc., the level of confidence on an upcoming trajectory may be less than a threshold. In these instances, the autonomous vehicle may not be able to determine an appropriate trajectory for navigating around the impediment.

At present, and in order to circumnavigate the impediment, AVs have begun to implement remote control by remote supervision and/or by remote operator. Remote supervision, for example, can send a new trajectory, or path, to the AV and enable the AV to manage the path. In the case of remote control by remote operator, the AV may be operated entirely by the remote operator.

Remote supervision, including, sending a new path, is limited by the navigational requirement that the surrounding environment be well-understood (e.g., classified/labeled). This, however, is rarely the case as working zones can be long, extremely complex, and filled with scenarios that may not be visible at the onset of navigation by remote supervision.

Remote driving, or remotely controlling the AV, is therefore better suited to handle such complex and longer working zone scenarios, as it provides human intervention throughout navigation of the working zone. While more effective on a case by case basis, remote driving in its current form is not scalable to a large fleet of AVs as it requires a remote, human operator to intervene in each and every instance of an impediment that cannot be handled by the AV, even in cases where multiple driverless vehicles have traveled the same road and encountered the same impediment.

Moreover, the above-described impediments or, for instance, infrastructure changes, may not be immediately updated within navigational maps and, therefore, other vehicles are not aware of the changes until they arrive at the same location.

Therefore, the present disclosure provides a new approach to remote control of an AV, and updated of navigational maps, therefrom, that is scalable to a large fleet of AVs.

Reference throughout this document to actions by a "remote operator" can be considered analogous to actions by a "remote controller" in that a "remote controller" includes a "remote operator" providing direction and annotations to an AV via a "remote control center". "Remote operator" and "remote controller", therefore, may be used interchangeably herein.

According to an embodiment, the present disclosure is related to using actions performed by a remote operator, including information describing a new trajectory, or path, and scene annotation information, in order to automatically update navigational maps. These navigational (NAV) maps can include, among others, high definition (HD) maps, as would, be understood by one of ordinary skill in the art.

According to an embodiment, a path taken by a remote operator while controlling an AV, with all attendant scene information recorded from each vehicle sensor on the AV, as stored to a local NAV map of a vehicle control system, can be uploaded to and integrated with a global NAV map for access by each AV of a fleet of AVs. This uploaded path and attendant scene information can then be downloaded and used by other AVs of the fleet of AVs when overtaking the same (or similar) impediment. In contrast to previous developments in AV navigation, this will eliminate the need for other AVs to request remote driver for the same impediment. In some embodiments, the attendant scene information may include sensor fusion maps of the environment.

According to an embodiment, the remote operator, or an annotation team, can annotate the scene by providing information about the impediment and the duration of the impediment, or, for example, a working zone. In an embodiment, annotation may be performed during remote control (i.e., in real-time) or following remote control (i.e., post-processing). Annotation can include, for example, information related to the meaning of a temporary traffic sign that would not be easily understood by the vehicle sensors of the AV. Annotations of the scene, in addition to the path, can be automatically updated within the NAV map.

According to an embodiment, the impediment, and attendant path and annotations, can be either permanent or temporary, as annotated. For example, a remote operator can indicate road construction is scheduled to end on a specific date and, therefore, the path and annotation of the updated NAV maps can be scheduled to expire on that date.

According to an embodiment, the NAV map can again be updated by other AVs driving the same route in a scenario where the previous impediment is no longer present. For example, if a subsequent AV does not detect a working zone r obstacle via its vehicle sensors, the NAV map can be updated. In a first example, the NAV map can return to a previous version of the NAV map wherein the path and annotations, or path and/or annotations as recorded in a layer appended to the NAV map, are removed. In a second example, the NAV map can again be updated, as if a new 'impediment' is present, in accordance with a new traffic pattern created in the wake of the working zone.

According to an embodiment, each update can be stored to a local NAV map (i.e. in a vehicle control system on the AV) and can be shared with other AVs within a fleet of AVs, in real-time via wireless communications or offline via wireless or wired communications. In doing so, each AV of the fleet of AVs can learn a new navigational path for a specific impediment and, therefore, not require a redundant, remote operator in each instance.

With reference to the Figures, FIG. 1 is an illustration of an AV, according to an exemplary embodiment of the present disclosure. In order to operate accurately and with precision, the AV 100 can be outfitted with a plurality of vehicle sensors, including, among others, one or more cameras 106, one or more surround view cameras 107, at least one radar (radio detection and ranging; herein "radar") 108, at least one LiDAR (light detection and ranging; herein "lidar") 109, at least one ultrasonic sensor 110, and one or more corner radar 111. Data acquired from the plurality of vehicle sensors can be sent to a vehicle control system 101, comprising, among other components, processing circuitry, a storage medium, image processing circuitry, and communication circuitry, in order to be processed, both locally and globally, and utilized in navigation. In one embodiment, the vehicle control system can be an electronic control unit, "electronic control unit" being used therein to describe any embedded system in automotive electronics that controls one or more electrical systems or subsystems in a vehicle, including, among others, a telematics control unit and, a powertrain control module. One implementation of the vehicle control system is illustrated FIG. 9.

The above-described vehicle sensors of the AV 100 will be discussed in brief below.

Regarding the one or more cameras 100, the cameras may be positioned along a forward panel of the AV 100 and arranged such that, in the case of a plurality of cameras, a parallax is created between the viewpoints. The parallax can be subsequently exploited, based upon the fixed geometric relationship between the viewpoints along the panel of the AV 100, to determine a distance to an obstacle, or impediment. To this end, the one or more cameras 106 may provide mono- or stereoscopic perspective. The one or more cameras 106 can employ, among other sensors, CMOS image sensors.

Regarding the one or more surround view cameras 107, the cameras may be positioned around the AV 100 in order to create a parallax and to obtain a 360° representation of the vehicle surroundings. As before, the parallax can be subsequently exploited, based upon the fixed geometric relationship between the viewpoints, in order to determine a distance to an obstacle, or impediment. The one or more surround view cameras 107 can employ, among other sensors, CMOS image sensors.

Regarding the above-described one or more cameras 106 and one or more surround view cameras 107, in addition to distancing, the output of the cameras can be further processed by the vehicle control system 101 to identify the vehicle surroundings. For instance, image processing circuitry of the vehicle control system 101 can perform an image classification operation on the output of the cameras.

Regarding the at least one radar 108, the radar may be positioned along a forward panel of the AV 100. The at least one radar 108 can be one selected from a group of radars including, among others, short range radar, medium range radar, and long range radar. In an embodiment, and as employed commonly in Adaptive Cruise Control and Automatic Emergency Braking Systems, the at least one radar 108 is long range radar, with an operational range of, for example, a few hundred meters.

Regarding the at least one lidar 109, the lidar may be positioned, for example, at a forward facing position and/or at a position with a 360° viewpoint. The at least one lidar 109 can be an infrared lidar system using a rotating laser via a micro-electro-mechanical system, a solid-state lidar, or any other type of lidar. In one embodiment, the at least one lidar 109 can provide a 905 nm wavelength with up to a 300 meter operational range.

In an embodiment, and with necessary considerations, radar and lidar may be interchangeable for certain distancing applications.

Regarding the at least one ultrasonic sensor 110, the ultrasonic sensor may be disposed at corners of the AV 100 for, in particular, short-range distancing. The at least one ultrasonic sensor 110 can be an ultrasonic sensor having asymmetric directivity (110°×50°), short ringing tune and high sound pressure, sensitivity and reliability, and be configured to produce, among others, a 40 kHz, 48 kHz, 58 kHz, or 68 kHz nominal frequency as required by the current situation.

Regarding the one or more corner radars 111, the radars can be substantially similar to the above-described at least one radar. Deployed as corner radars 111, the one or more corner radars can be short range radar or medium range radar, as demanded, and can be broadband Frequency Modulated Continuous Wave radar.

A combination of longitudinally-acquired (time-based) data from the above-described camera and distancing systems (radar and/or lidar) can be used to extract speed and outlines of obstacles and moving objects.

Figure 2:
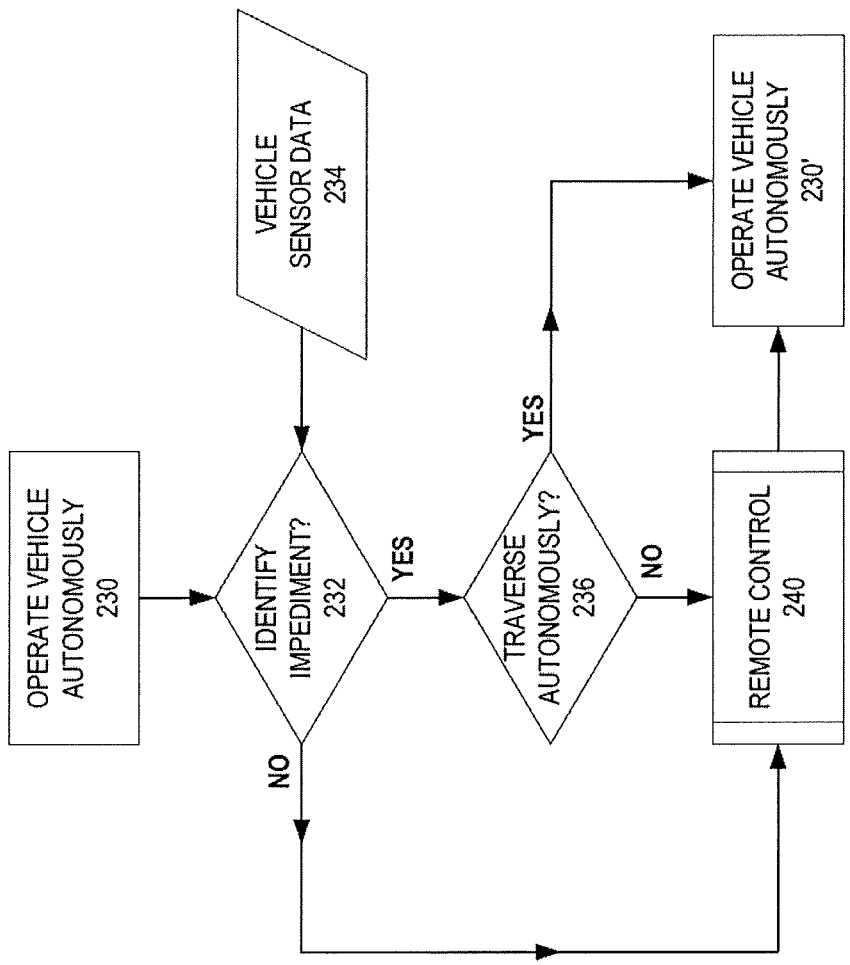
FIG. 2 is a flow diagram of impediment navigation, according to an exemplary embodiment of the present disclosure.

According to an embodiment, and with reference to step 240 of FIG. 2, the above-described vehicle sensors, in communication with the vehicle control system 101, allow for remote control of a driving operation of the AV 100. For example, the one or more cameras 106 can be used to oversee the surrounding of the AV 100 when the remote operator is commanding the AV 100 to overtake an impediment. In instances where an object is proximate the AV 100, and wherein the above-described cameras 106 are limited in their ability to accurately determine distances, a remote operator may use additional sensors, as described above, such as the one or more surround view cameras 107, the at least one radar 108, the at least one lidar 109, the at least one ultrasonic sensor 110, and the at least one corner radar 111, to remotely control the driving operation of the AV 100. It can be understood by one of ordinary skill in the art that the above-described vehicle sensors do not constitute an exhaustive list and are merely exemplary of vehicle sensors that may be found on an AV. In that context, any combination of vehicle sensors, described herein or not, can be integrated in order to achieve the function of operation of an AV, either autonomously or through remote operation.

With reference again to FIG. 2, FIG. 2 is a flow diagram of impediment navigation, according to an exemplary embodiment of the present disclosure. Initially, at step 230, an AV operates normally in fully-autonomous mode according to the data received at each of the plurality of vehicle sensors and in accordance with an expected environment per a NAV map stored locally. In the course of fully-autonomous operation, however, the AV may approach an unexpected impediment.

At step 232, in context of the data received from the plurality of vehicle sensors at step 234, the vehicle control system attempts to identify the impediment. If, for example, the impediment cannot be identified, then it will be unlikely for the AV to navigate the impediment and a remotely controlled sub-process is initiated at process 240. Alternatively, if the vehicle control system is able to determine the identity of the impediment, the vehicle control system then attempts to determine an appropriate AV path.

At step 236, the vehicle control system, accessing the locally-stored NAV map, determines if a path around the identified object is possible. If, for example, a tire retread is lying toward the edge of the driving lane, the vehicle control system may determine, in light of the NAV map and driving rules, that it is possible to navigate the AV around the tire retread without, for instance, exiting the driving lane (and thus, as will be described later, breaking a driving rule such as crossing a double yellow solid line). In this case, autonomous operation of the AV continues and the impediment is circumnavigated. However, if it is determined that the AV cannot navigate around the impediment without, for example, breaking a driving rule, remotely controlled mode of operation of the AV, as described in process 240, may be initiated (or requested).

Following circumnavigation of the impediment via remotely controlled mode of operation at process 240, which is described in detail with reference to FIG. 3A, the AV may return to fully-autonomous operation at step 230'.

Further to the above with regard to step 236, in certain instances, as an AV approaches an unknown or unexpected situation, or impediment, the AV may not be able to define its own path. This can happen, for example, when the situation requires the vehicle to break a predefined driving rule (e.g., crossing a double yellow solid line, turning left at a red light, . . . , etc.). In such cases, and as described, the AV will safely halt operation and request remote operation.

Figure 3A:
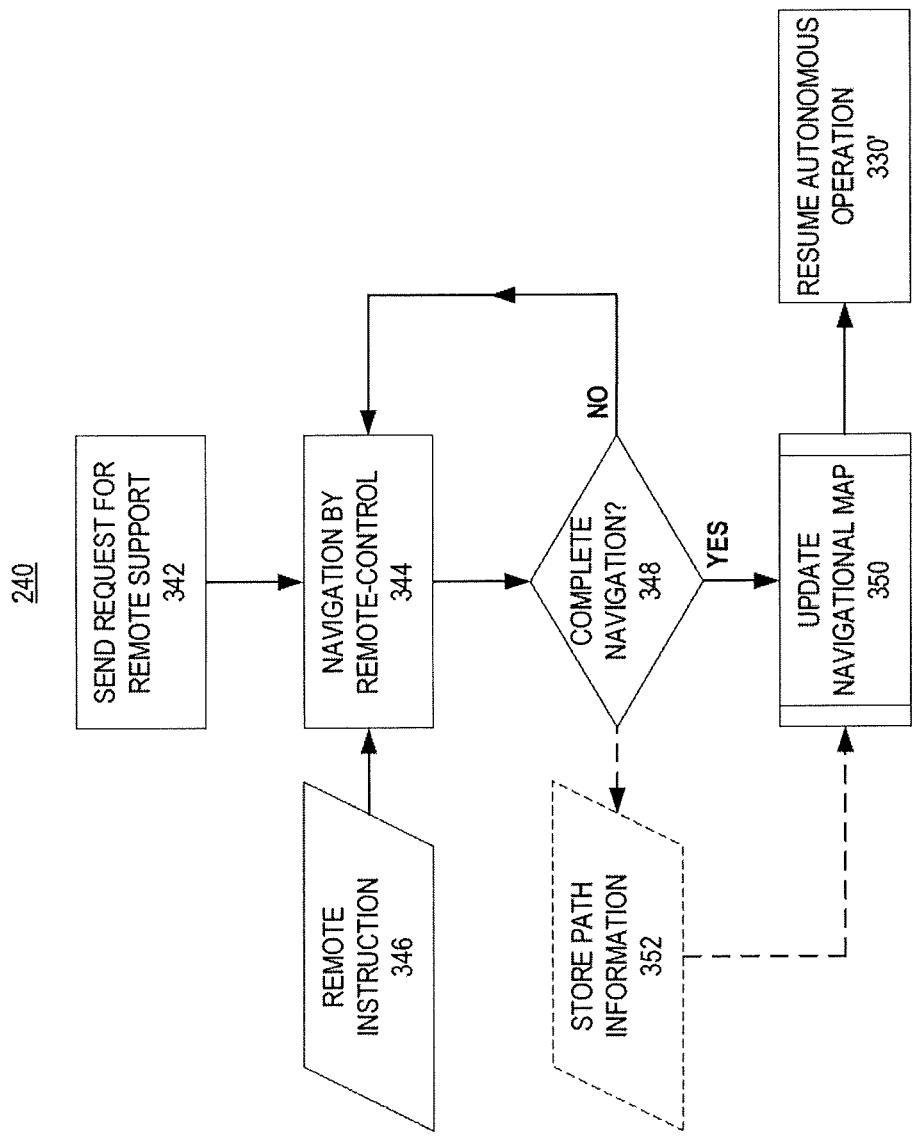
FIG. 3A is a flow diagram of remotely controlled impediment navigation, according to an exemplary embodiment of the present disclosure.

With reference now to FIG. 3A, following determination that a path around an impediment cannot be defined, the AV may submit, at step 342 of process 240, a request for remote support. Subsequently, the AV can be connected to a remote operator at a control center and an appropriate action can be defined. In an embodiment, the operator determines that intervention is required and, at step 314 of process 240, takes control of operation of the AV in order to navigate around the impediment.

At step 344 of process 240, and in context of the remote instruction received at step 346 from the remote operator, remotely controlled mode of operation of the AV is initiated. In an embodiment, remotely controlled mode of operation includes (1) providing information from the plurality of vehicle sensors to the remote operator and can be defined by (2) implementing a driving command as provided to the AV in response to the information of (1). In addition to providing information from the plurality of vehicle sensors to the remote operator for navigation, the information from the plurality of vehicle sensors can be stored locally within a temporary or permanent storage medium of the vehicle control system for subsequent processing. In addition to information from the plurality of vehicle sensors, the remote operator can provide annotations and/or comments, in real-time or in post-processing, in order to completely describe the scene. Remote operator annotation will be described, in detail, with reference to FIG. 4A and FIG. 4B. In an embodiment, remote navigation comprises cautious navigation of the AV to overtake the impediment which may be, for instance, an obstacle, a working zone, and the like.

In an embodiment, the information from the plurality of vehicle sensors constituting path information, as described in step 352 of process 240, can be stored in temporary storage until completion of remote operation. When it is determined, at step 348 of process 240, that remote control is complete and the impediment has been circumnavigated, process 240 proceeds to storage of path information (step 352 of process 240) and updating (process 350 of process 240) of the local NAV map. For example, as alluded to, path information related to the information from the plurality of vehicle sensors can be moved from temporary storage to permanent storage within the vehicle control system. As will be described in detail with reference to FIG. 4A, information acquired from each of the plurality of vehicle sensors, which provide a complete description of the surrounding AV environment during the course of navigation, can be combined with remote operator annotations, in process 350 of process 240, in order to update the local NAV map, thereby providing driving instructions for the impediment. With remote operation completed, the AV can return to normal, fully-autonomous operation at step 330' of process 240.

Figure 3B:
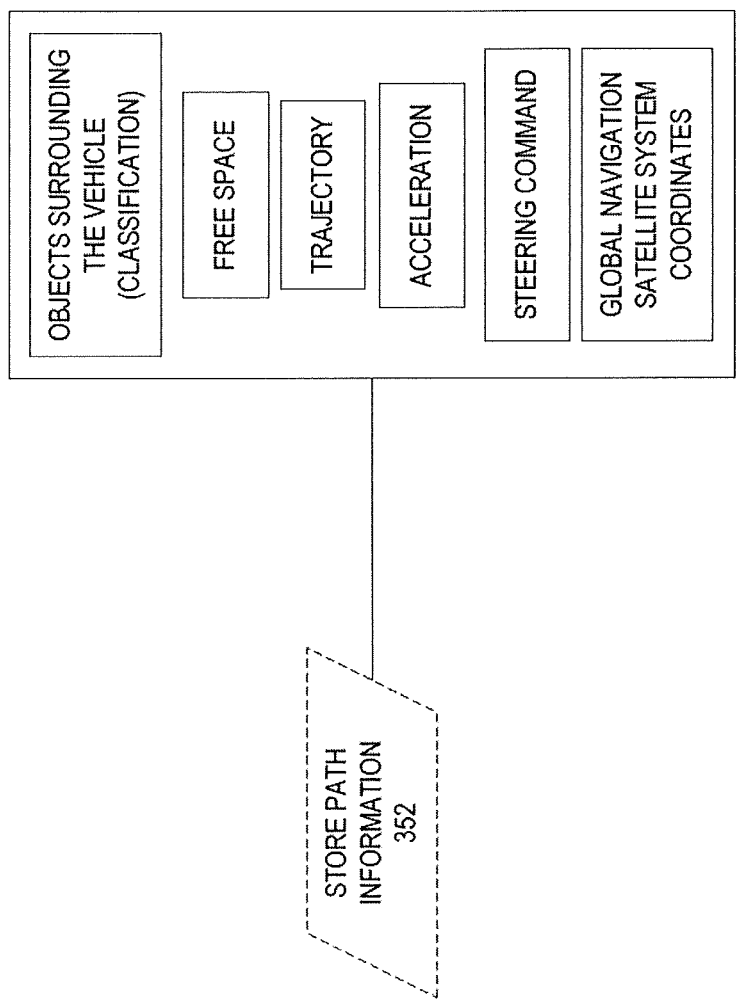
FIG. 3B is a block diagram indicating path information acquired by an autonomous vehicle, according to an exemplary embodiment of the present disclosure.

With reference to FIG. 3B, during remote control and following completion of remote operation of the AV, path information from the plurality of vehicle sensors can be collected by the AV, processed and stored in the vehicle control system or wirelessly transmitted, in real-time, to the remote operator for improved guidance of the AV. In addition to the plurality of vehicle sensors previously described, this stored path information, as described in step 352 of process 240, can include Global Navigation Satellite System (GNSS) coordinates as determined by a positioning system such as, among others, a Global Position System (GPS). In an embodiment, GNSS coordinates, including latitude and longitude, can be exploited in a time-domain to record AV path and store the new AV path, in context of the location to the local NAV map. Moreover, the stored path information of step 352 can include features of the surrounding environment derived from the GNSS coordinates and from information from the plurality of vehicle sensors. These features of the surrounding environment can include, as shown in FIG. 3B, free space around the vehicle, including a map of the environment, the trajectory and acceleration of the AV and surrounding vehicles, the steering command of the AV (as instructed by the remote operator), the distance/speed of static/dynamic objects surrounding/proximate the AV, and image classification of objects surrounding the vehicle as captured in images by the cameras (including surround view) and processed by the vehicle control system. In an embodiment, the objects surrounding the vehicle can be evaluated with respect to, among other things, size and location, and can be classified with respect to the identity of the object. For example, if an impediment is an obstacle in the middle of the road, or, for instance, a felled limb of a tree, the vehicle sensors can evaluate the size and location of the now classified 'tree limb' and this information can be included in the stored path information, the stored path information being subsequently updated within the local NAV map.

Each of the above described pieces of information can be time-locked or otherwise integrated such that mutual, inter-dependent object identification can be evaluated.

Having been acquired, stored, and processed locally within the vehicle control system, the modified data can be wirelessly transmitted by a wireless communication hub of the vehicle control system to a cloud-computing environment for storage and further processing and utilization. The wireless communication hub, having communication circuitry, of the vehicle control system can implement communication methods such as, among others, Long-Term Evolution (LTE), 4G, 5G, Wi-Fi, WiMAX, and dedicated short-range communications (DSRC). Information acquired from the plurality of vehicle sensors including, for example, camera data, can be transmitted in a processed format, or in the case that limited processing power is available within the vehicle control system, in a raw format so that processing can be performed in the cloud-computing environment by cloud-computing processing circuitry.

Figure 4A:
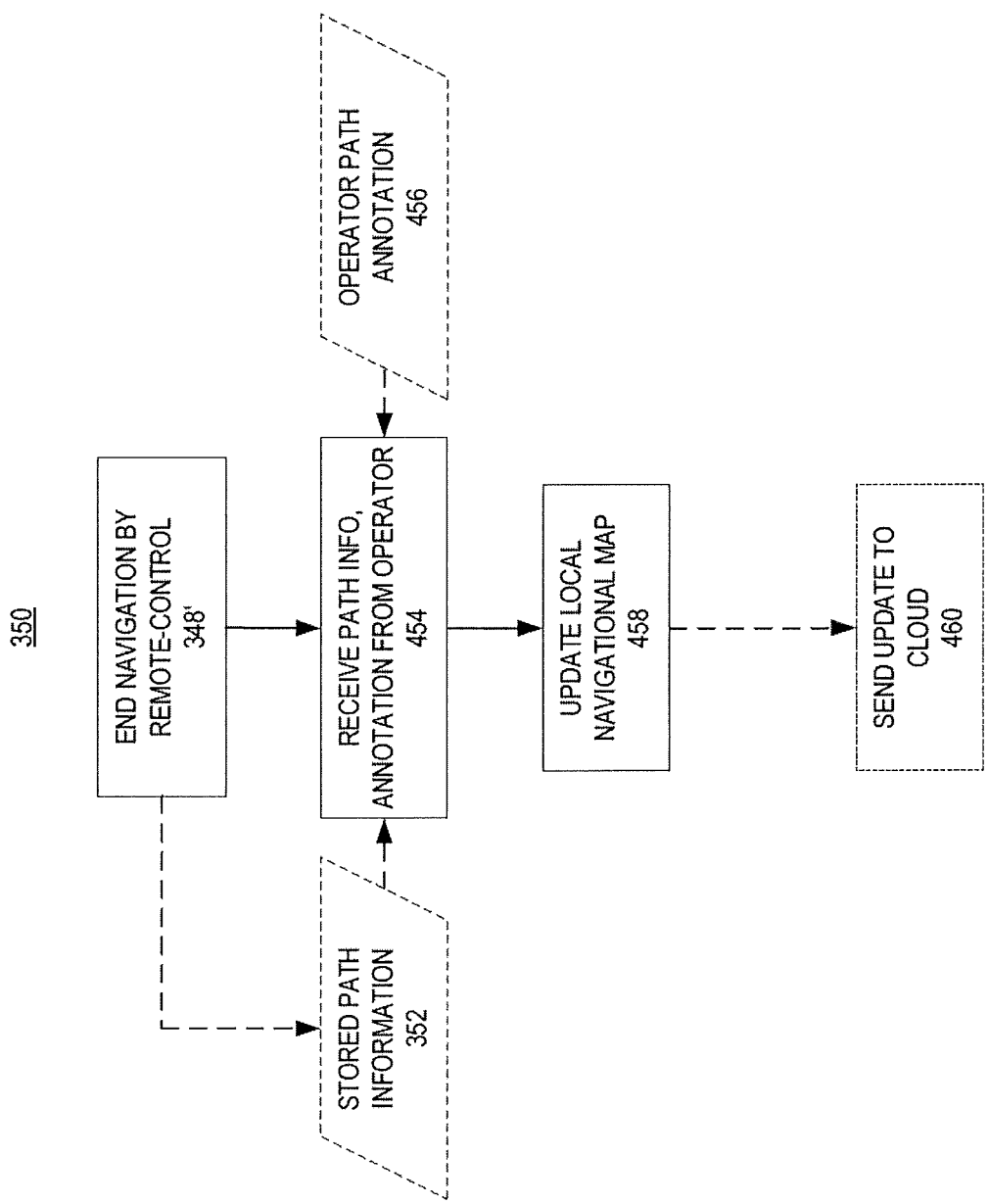
FIG. 4A is a flow diagram of navigation map updating, according to an exemplary embodiment of the present disclosure.

With reference now to FIG. 4A, updating process 350 of process 240 will be described. According to an exemplary embodiment of the present disclosure, following completion of remotely controlled mode of operation at step 348' of process 240, a process for updating the NAV map can be initiated.

At step 454 of process 350, previously recorded path information and operator path annotations can be obtained by the vehicle control system. As described above, path information stored during remote operation, at step 352 of process of 240, can be combined with operator path annotation information provided at step 456 of process 350. Subsequently, at step 454 of process 350, these two data streams can be integrated by the vehicle control system and prepared for updating the local NAV map. In an embodiment, path information stored during remote operation can describe the actions of the remote operator including, as described above, AV trajectory, GNSS coordinates, acceleration, and steering commands, as well as information describing, among other things, objects surrounding the vehicle and free space.

In step 458 of process 350, the local NAV map can be updated, by the vehicle control system, according to the combined information of step 454.

In an embodiment, updating the local NAV map includes incorporating the above-described information regarding a new route/path, annotation and comments, within the existing local NAV map. Initially, the region where the remote operator has operated the AV remotely can be identified on the local NAV map and demarcated. Relevant path information and operator annotations, from step 454, can be added to the local NAV map. In an embodiment, the added information can be time-sensitive, as prescribed by the annotations of the remote operator. For example, based upon a sign in a working zone, the update to the local NAV map can be set to expire on a specific date, at which point the update to the local NAV map can be removed and the previously stored local NAV map can be restored.

Updates to the local NAV map can be completed in a variety of ways. First, an update to the local NAV map can be made by modifying an existing layer of the local NAV map. In another way, the update to the local NAV map CM be completed by creating a new layer on the local NAV map. In the example wherein the remote operator indicates the NAV map update should be time-dependent, the new layer on the local NAV map can be created with a specific duration such that it disappears at the end of a desired period of time or, in other words, when a specific impediment is no longer expected to be present.

In step 460 of process 350, the updated local NAV map can be uploaded, or transmitted, by the vehicle control system to the cloud-computing environment or a central server for dissemination to the fleet of AVs.

According to an embodiment, the updated local NAV map can be immediately uploaded to the cloud-computing environment in real-time a wireless communications including, for example, cellular communications or can be stored locally until the AV returns to a home base at which point the updated local NAV map can be integrated, with a cloud-computing-based global NAV map via wireless communications including for example, Wi-Fi, or via wired connection.

According to an embodiment, the updated global NAV map can be updated according to the relevant region of the local NAV map, in order to conserve processing power, or the updated global NAV map can be updated completely based upon the updated local NAV map.

Figure 4B:
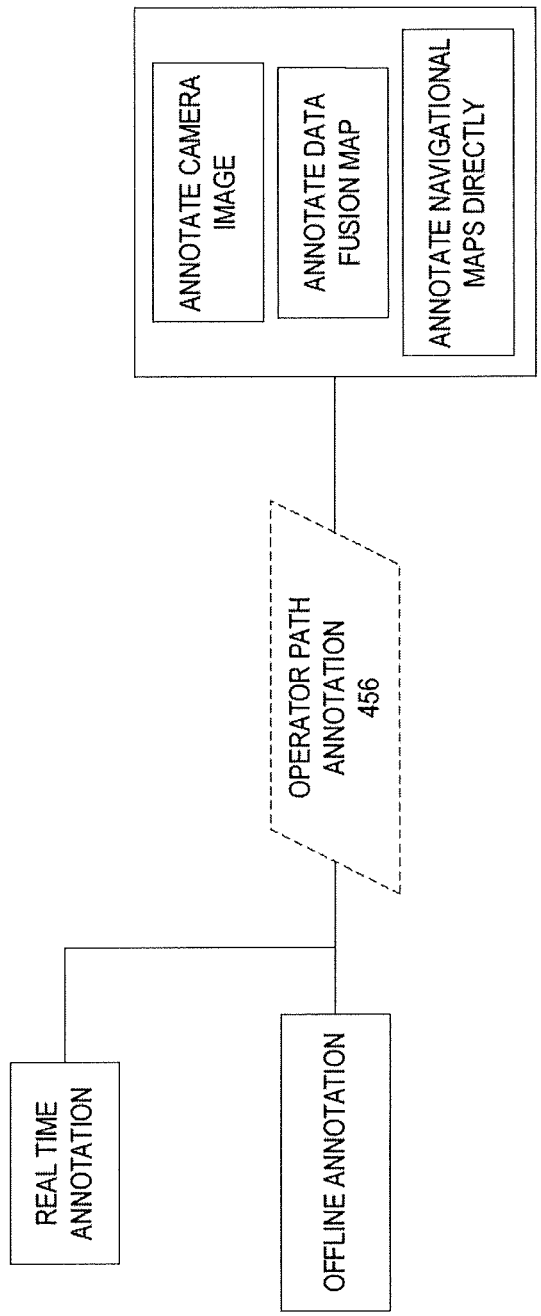
FIG. 4B is a block diagram indicating methods of annotation by a remote operator, according to an exemplary embodiment of the present disclosure.

With reference now to FIG. 4B, a block diagram indicates methods of annotation, as implemented in step 456 of process 350. Operator path annotation provides information and context for an impediment that would not be easily discernible by the plurality of vehicle sensors, alone. For example, in the case of a temporary traffic light, the plurality of vehicle sensors, and vehicle control system connected thereto, may not correctly classify the object and may, therefore, without operator path annotation, be unable to understand the proper traffic pattern. In another example, as discussed above, the plurality of vehicle sensors, and vehicle control system connected thereto, may not be able to recognize the text on a working zone sign. In cases where the text on the working zone sign indicates a temporary nature of the working zone, the remote operator can provided annotation and context such that related updates to the local NAV map (and global NAV map, therefrom) are appropriately temporary.

Operator path annotation can be completed in (1) real-time, during operation, or can be completed (2) offline, in post-processing. Generally, path annotation can be completed by the remote operator or by an annotation team which is monitoring the remote operator display and the path information data acquired by and transmitted by the plurality of vehicle sensors.

With regard to (1) real-time annotation, annotation can be completed either by the remote operator or by the annotation team. In an embodiment, the annotation team coordinates with the remote operator to understand the remote operator's decision making regarding the impediment.

With regard to (2) post-processing annotation, which can be completed 'offline', annotation can be performed by the remote operator after completing the navigation operation or, alternatively, or complementarily, by the annotation team. In such, a case, the rewrote operator or the annotation team can playback the path information recorded during the navigation process, including the data acquired and processed by the vehicle control system from the plurality of vehicles sensors, and annotate the scene ex post facto.

The above annotation strategies can, in addition to providing text recognition, object classification, and the like, include defining new driving rules that the AV can follow in specific situations. For instance, if a remote operator is forced to cross a double yellow solid line in order to circumnavigate an impediment, an action that an AV would not naturally take, the remote operator can annotate the scene such that crossing the double yellow solid line is permissible in related situations. Such driving rules can be defined such that they do not impact other scenes. For example, a geo-fence may be established wherein a driving rule only applies within the geo-fence. In another example, if the driving rule defines that an AV has the right to cross the double yellow solid line, the driving rule can be limited to a specific working zone and not for another, similar situation. In order to further limit its scope, the driving rule can be defined such that it is not used by the vehicle control system as a training dataset for other impediment situations or scenes.

The above-described annotations are used in providing sufficient scene and path information such that a subsequent AV may be able to understand how to circumnavigate the impediment.

According to an embodiment, the above-described annotation by the remote operator or the annotation team can be performed on (1) an image obtained from the cameras and the surround view cameras of the AV, (2) on a data fusion map, or (3) on the local HD maps, directly.

With regard to (1) annotating an image, directly, the remote operator or the annotation team can aid the image processing circuitry of the vehicle control system in performing object classification and text recognition. For instance, the remote operator or the annotation team can label objects of an image by labeling techniques including, among others, bounding box, semantic segmentation, and instance segmentation. In an embodiment, in addition to manual labeling, the images can be labeled by using computer vision algorithms. Having further annotated the image, directly, providing additional information and context, the vehicle control system can process the classification, accordingly, during the update to the local NAV map.

With regard to (2) a data fusion map, data acquired by each of the plurality of vehicle sensors can be annotated in context of the AV environment. For instance, the remote operator or the annotation team can analyze a lidar point cloud and label objects, as appropriate.

With regard to (3) annotating the local NAV map, directly, the remote operator or the annotation team can provide granularity to the scene from a holistic, AV perspective. In an example, the remote operator or the annotation team can add traffic signs, traffic signals, and lane information from the NAV map. Additionally, the remote operator and the annotation team can indicate the importance of specific objects within a scene to the navigability of the scene. For example, a remote operator or annotation team can visualize how an AV is understanding and interacting with its external environment and, based on its performance, add 'penalties' for, for instance, failed object classification. Said 'penalties' increase the level of importance of specific environmental features during subsequent events.

Figure 5A:
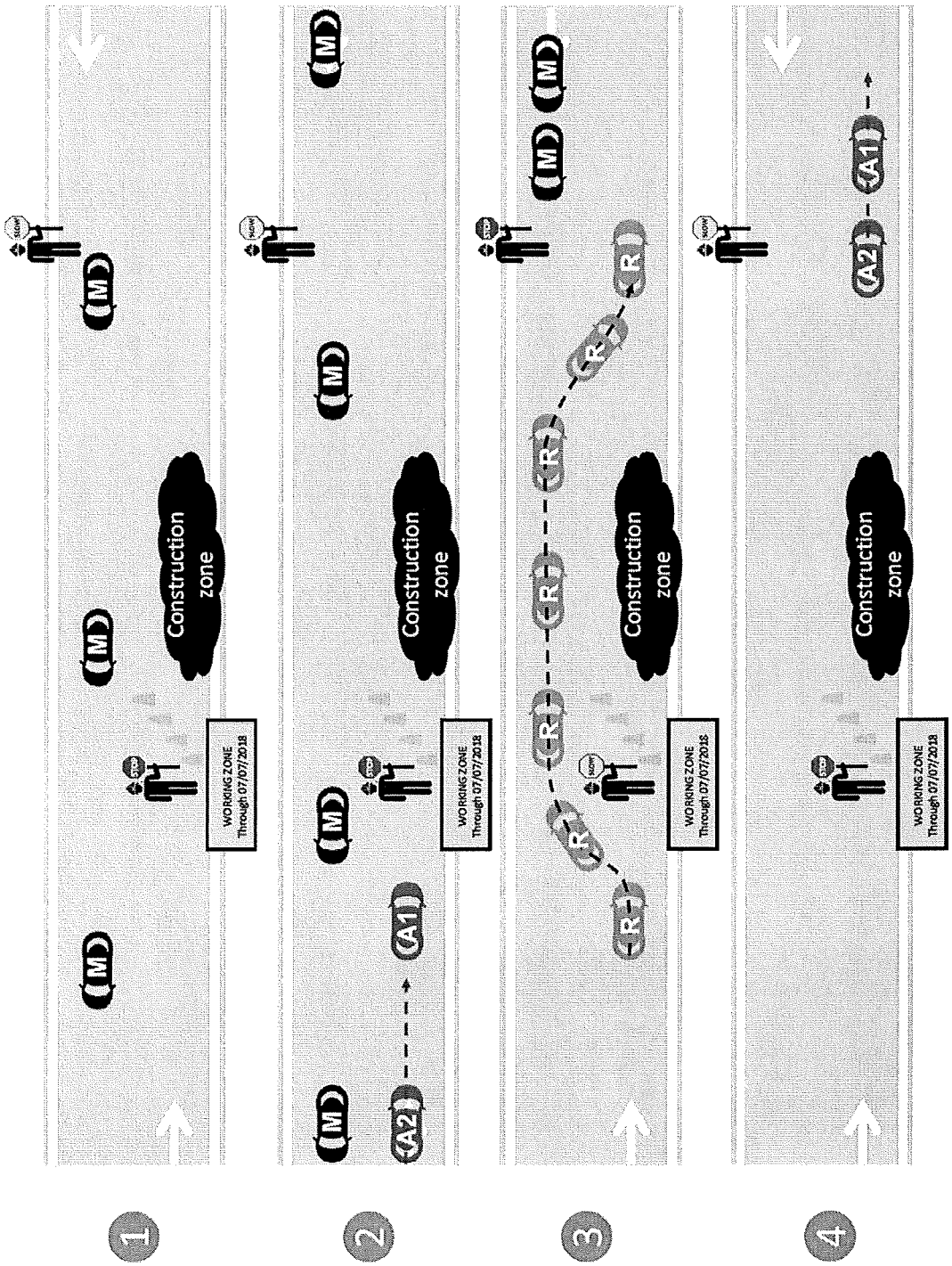
FIG. 5A is a non-limiting example of remotely controlled navigation of an impediment scenario, according to an exemplary embodiment of the present disclosure.

With reference now to FIG. 5A, FIG. 5A is a non-limiting example of remotely controlled navigation of an impediment scenario, according to an exemplary embodiment of the present disclosure. Considering each of the 4 panels depicted, FIG. 5A demonstrates an example of circumnavigation of an impediment by an AV.

First, Panel 1 illustrates a construction zone as an impediment to travel of the AV. The construction zone is in the lane of travel of the AV, on a two-lane road, wherein the two lanes of traffic are separated by a double yellow solid line. A first construction worker alerts drivers to the construction zone by holding and controlling a binary 'STOP' and 'SLOW' traffic sign. A second construction worker, positioned in the other lane and at the opposite end of the construction zone, holds and controls a similar binary traffic sire so that traffic can be managed in both directions. Arrows indicate the direction of traffic in each lane. A letter on the roof of each vehicle indicates whether the vehicle is under manual control ("M"), autonomous control ("A1" and "A2"), or remote operation ("R").

In Panel 1, the second construction worker displays 'SLOW', and the manually operated vehicles, denoted by "M", proceed.

In Panel 2, an AV, denoted by "A1", approaches the first construction worker while traveling in the opposite direction from the manually-operated vehicles. Using the plurality of vehicle sensors and local NAV map, the vehicle control system of A1 identifies aspects of the construction zone, or impediment, in the roadway, including the traffic sign of the first construction working indicating 'STOP'. While attempting to find a path around the impediment, however, A1 identifies the double yellow solid line. In order to circumnavigate the impediment, A1 would be required to cross the double yellow solid line, an action defined as unlawful. When the construction worker transitions the sign from 'STOP' to 'SLOW', A1 may not be able to define a new path without crossing the double yellow solid line. At such a moment, A1 requests assistance from a remote operator.

With reference to Panel 3, a remote operator, denoted by "R", takes control of A1. Using information acquired from the plurality of vehicle sensors and processed and/or transmitted by the vehicle control system, the remote operator circumnavigates the construction zone and returns A1 to an expected path in the expected lane of travel.

With reference to Panel 4, upon returning A1 to the expected path in the lane of travel, control of the vehicle can be returned to A1.

Figure 5B:
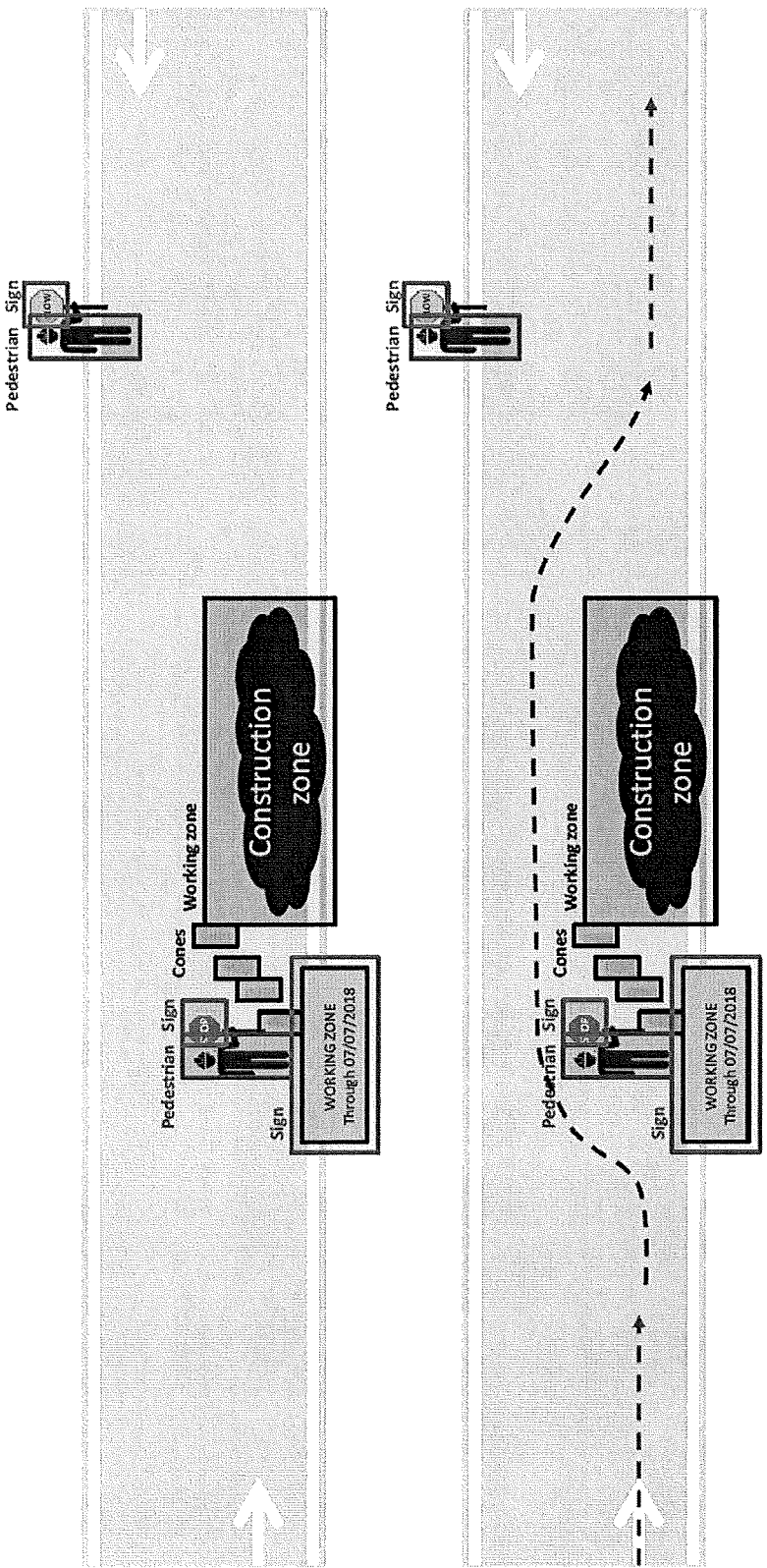
FIG. 5B is a non-limiting example of path information and annotation of remotely controlled navigation of an impediment scenario.

In an example, during the circumnavigation of FIG. 5A, the remote operator or an annotation team may not have annotated the path information and scene in real-time. Instead, having overcome the impediment and with reference now to FIG. 5B, the remote operator can replay the scene and provide annotations and comments to the scene ex post facto. In an embodiment, the remote operator can provide a comment regarding the duration of the construction zone. For example, as shown in FIG. 5B, a sign at the construction zone, detected but not properly classified by the plurality of vehicle sensors, and the vehicle control system connected thereto, indicates that the working zone is expected to be active through Jul. 7, 2018, and the remote operator can provide annotations, accordingly. In such cases, the path update can then be configured to expire at the expected finish time of the construction zone (e.g., Jul. 7, 2018). Moreover, beyond text recognition, the remote operator can provide annotation as to the complexities of the construction zone that may be detected but not identified and classified by the plurality of vehicle sensors and attendant processors. For example, the remote operator can provide annotations regarding the pedestrian, the cones, and the construction zone, among others.

In this way, and in order to provide complete detail as may be needed for a subsequent AV to navigate the area, stored path information and annotations can be updated in the local NAV map.

According to an embodiment, and with reference again to FIG. 5A, the above-described path navigation and annotation may not be uploaded to a global NAV map (and therefore not downloadable by each AV of an AV fleet) before a subsequent AV approaches the same obstacle.

In Panel 1, the second construction worker displays 'SLOW', and the manually operated vehicles, denoted by "M", proceed.

In Panel 2, a subsequent AV, denoted by "A2", approaches the first construction worker while traveling in the opposite direction from the manually-operated vehicles. Using the plurality of vehicle sensors and local NAV map, the vehicle control system of A2 identifies aspects of the construction zone, or impediment, in the roadway, including the traffic sign of the first construction working indicating 'STOP'. While attempting to find as path around the impediment, however, A2 identifies the double yellow solid line. In order to circumnavigate the impediment, A2 would be required to cross the double yellow solid line, an action defined as unlawful. When the construction worker transitions the sign from 'STOP' to 'SLOW', A2 may not be able to define a new path without crossing the double yellow solid line. At such a moment, if A2 has not received any updates in the global NAV map from A1 regarding the impediment, it requests assistance from a remote operator.

With reference to Panel 3, a remote operator, denoted by "R", takes control of A2. Using information acquired from the plurality of vehicle sensors and processed and/or transmitted by the vehicle control system, the remote operator can identify and understand that the obstacle and environment of A2 is identical to the obstacle and environment of A1. With this understanding, the remote operator can instruct A2 to navigate the obstacle via the same path followed by A1 under remote control. Consequently, A2 can autonomously navigate the obstacle according to the path of A1.

With reference to Panel 4, upon successfully navigating the obstacle and returning to the expected path in the lane of navel, A2 can continue autonomous operation.

Figure 6:
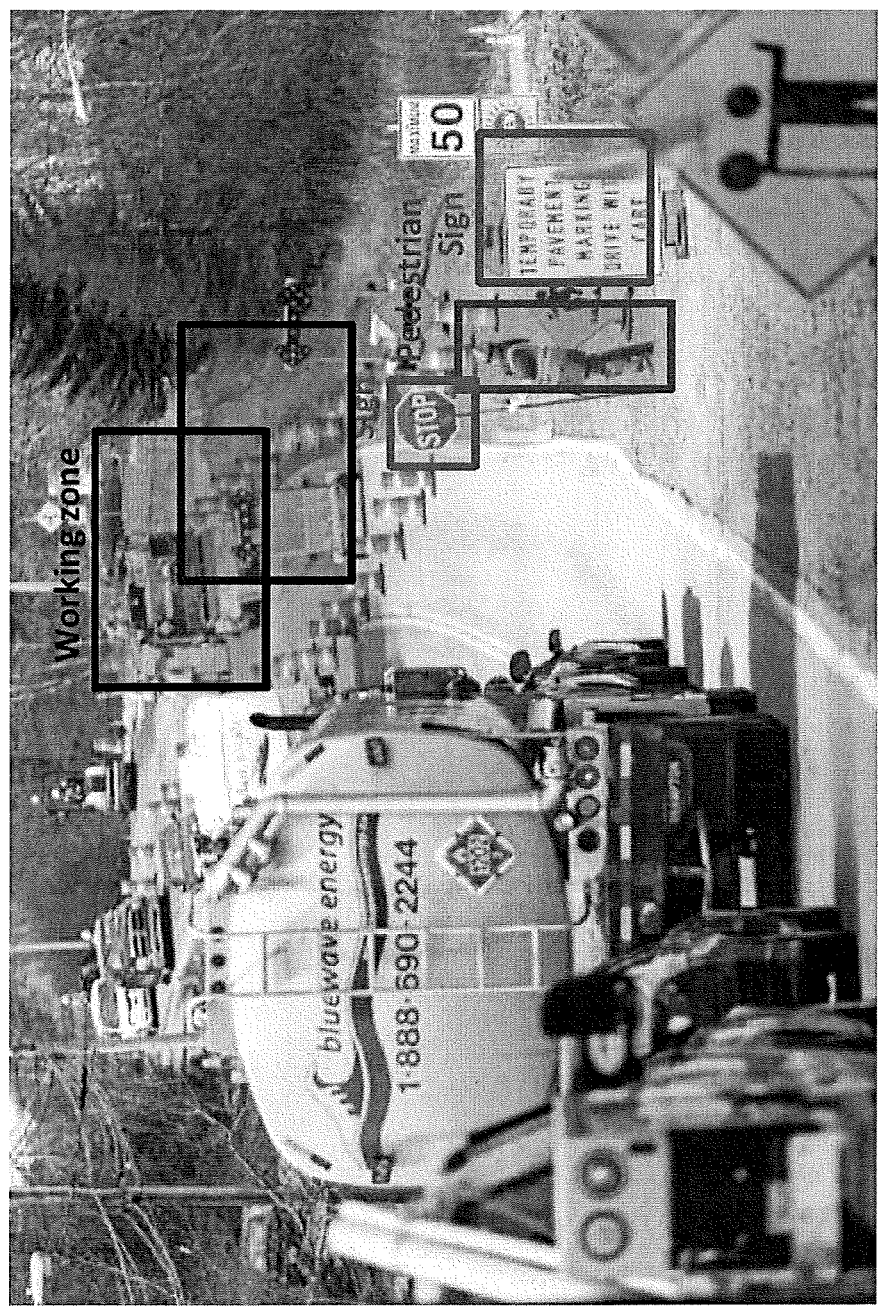
FIG. 6 is a non-limiting example of an annotated image acquired from an autonomous vehicle during impediment navigation, according to an exemplary embodiment of the present disclosure.

With reference to FIG. 6, FIG. 6 demonstrates a view of a working zone as observed by the plurality of vehicle sensors, and attendant processors, of an AV. Moreover, FIG. 6 demonstrates the necessity for remote operator annotation, as the AV may not be able to recognize and understand 'temporary pavement marking' or how to navigate in that context. In this way, complete annotation, in addition to acquisition of path information, allows a subsequent AV to navigate the same impediment without needing assistance.

Figure 7:
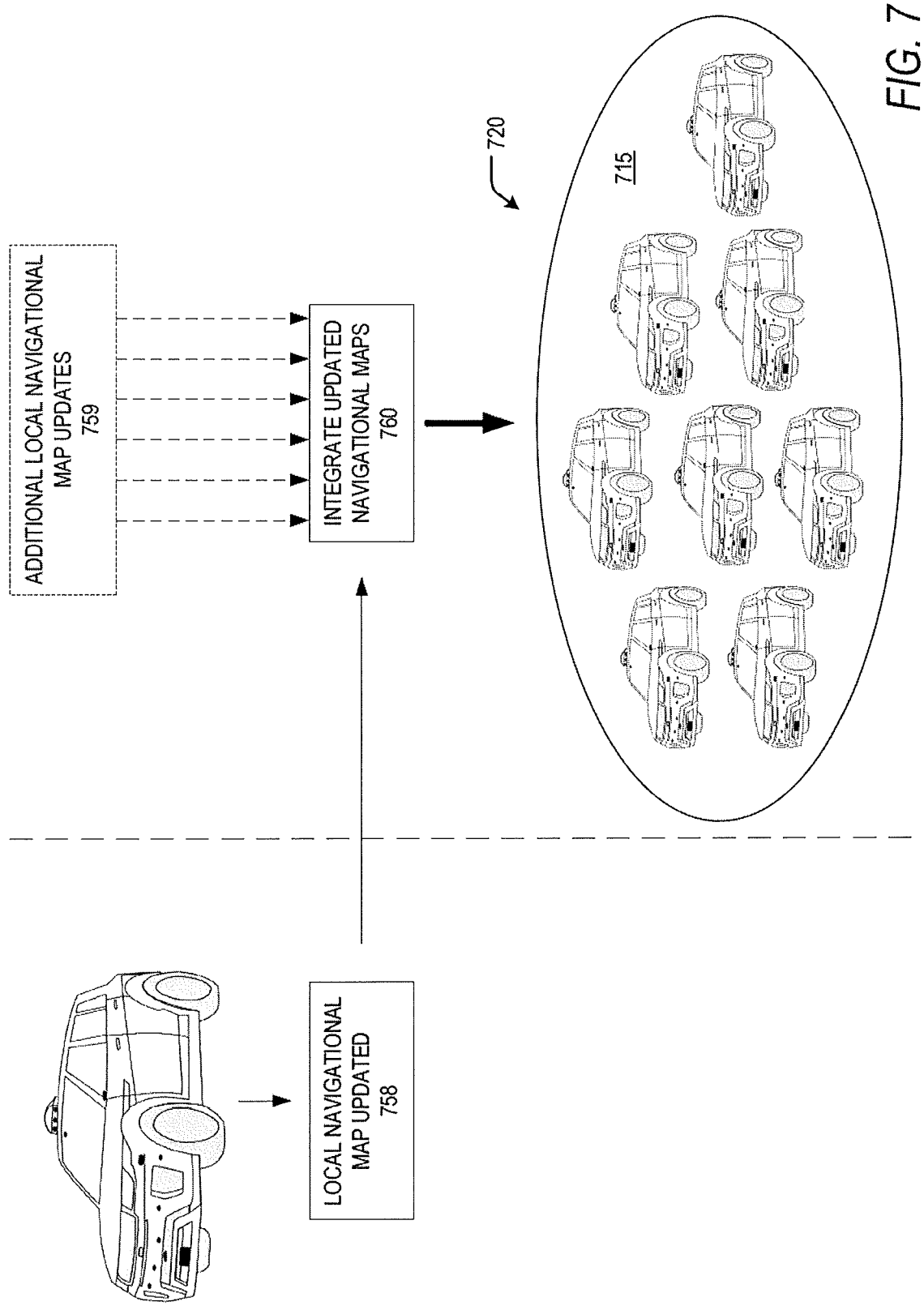
FIG. 7 is a schematic of fleet distribution of a local navigational map update, according to an exemplary embodiment of the present disclosure.

Referring now to FIG. 7, FIG. 7 is a schematic of fleet distribution of a local NAV map update. According to an exemplary embodiment of the present disclosure, having updated a local NAV map for a single AV at step 758, the update can be sent to a cloud-computing environment wherein the updated local NAV map can be integrated with the global NAV map at step 760. In an embodiment, the updated local NAV map is a layer with discerning features relevant to only a region of the global NAV map. In another embodiment, the updated local NAV map is a complete version, or a complete version of a layer, of the NAV map that is integrated with the global NAV map of the cloud-computing environment.

In an embodiment, a plurality of updated local NAV maps can be concurrently sent, in step 759, to the cloud-computing environment for integration into the global NAV map. The integrated global NAV map will be the combination of all the local updates from all of the time-locked data from each AV.

In the end, having integrated the one or more updated local NAV maps into the global NAV map of the cloud-computing environment, at step 760, the updated global NAV map can be distributed to the fleet of AVs 720 at step 715. In distributing the updated global NAV map to each AV of the fleet of AVs 720, each AV of the fleet of AVs 720 is then able to learn how to manage an impediment as was done by a remote operator of the initial AV. Moreover, by learning how to manage the impediment or, for example, plurality of impediments at varying map zones, the fleet, of AVs 720 is able to obviate the need to request remote operation when encountering those, or similar, impediments.

In an embodiment, sharing the updated global NAV map with each AV of the fleet of AVs 720 can be done in real-time or offline via wireless communication from the cloud-computing environment.

In an embodiment, and in the case where multiple AVs are traveling along a similar path, vehicle-to-vehicle (V2V) communication can allow for more immediate communication of impediment circumnavigation.

For example, a situation may occur wherein a first AV, having utilized a remote operator in navigating an impediment, delays, according to a configuration of the first AV, updating a global NAV map until the first AV returns to a parking spot, garage, or other 'home' location. In this case, the local NAV map update, and navigation therein, is not available to subsequent AVs that may travel the same route prior to the first AV updating the global NAV map (which, in turn, may be disseminated to the fleet of 'subsequent' AVs). V2V communication can be deployed in order to transmit the local NAV map update from the first AV to proximate AVs that may travel the same route. Therefore, though not mated within the global NAV map, the relevant remote operation path and annotations can be distributed to proximate AVs.

Further to the above example, the updated local NAV map can be distributed to, for instance, vehicles within a pre-determined radius of the first AV, the pre-determined radius being determined as a region of travel wherein a subsequent AV is likely to traverse the same route as the first AV. The pre-determined radius may be, assuming sufficient density of surrounding AVs to permit V2V communication, for instance, 10 miles.

In the end, upon returning to the parking spot, the garage, or other 'home' location, the first AV can transmit its local NAV map update to the global NAV map.

With reference again to step 760, a plurality of loud NAV map updates, from a plurality of AVs, can be evaluated, either in a cloud-computing environment or on an AV, and merged into an updated global NAV map. To this end, the global NAV map update can be handled in different ways.

First, if a local NAV map update is directed to a unique region or area of the global NAV map, the local NAV map update can be simply merged with the global NAV map.

Second, if a local NAV map update is directed to a region or area also updated by a second local NAV map update, the most recently recorded local NAV map update will be merged with the global NAV map.

Third, in a scenario where multiple local NAV map updates are recorded within a short time frame (e.g. concurrently or within minutes), the local NAV map update can be selected based upon the confidence level of each sensor and based upon the annotations of the remote operator. Accordingly, the most appropriate local NAV map update will be selected by, for example, the cloud-computing environment, for merging with the global NAV map.

The confidence level of each sensor can be managed at two levels: (1) the level of the sensor and (2) the level of the remote operator. In an embodiment, (1) each sensor and sensor fission on the AV can provide a confidence level for the detection of an object and the classification of an object. Accordingly, the vehicle control system can use this information to compare concurrent local NAV map updates to determine which is more confident. Moreover, in an embodiment, (2) the remote operator can provide annotations as to the confidence level of the plurality of vehicle sensors based upon remote operator visualization in the context of the performance of the plurality of vehicle sensors. For example, though a vehicle sensor may exhibit a high-level of confidence, a remote operator may determine that the vehicle control system has not accurately detected and/or classified an object of the scene, and can, therefore, lower the confidence level of that vehicle sensor.

In an embodiment, and with regard to the third scenario described above, a situation may occur in which a first AV, having delayed transmittal of an updated local NAV map, is followed by, for instance, a second AV and a third AV traveling along the same route which must also request assistance from a remote controller. A distinct remotely controlled path and annotation may then exist for each of the first AV, the second AV, and the third AV describing the same navigation. In one embodiment, evaluation and selection of the updated local NAV maps of the first AV, the second AV, and the third AV and merging with the global NAV map may proceed, as described above, in the cloud-computing environment. In another embodiment, selection of the updated local NAV maps of the first AV, the second AV, and the third AV may be performed locally by the vehicle control system of one AV of the three AVs prior to being transmitted for merging with a global NAV map. For example, the first AV may receive, upon returning to its parking spot, garage, or 'home' location, the updated local NAV map from each of the second AV and the third AV. Based upon the relative time of travel, the confidence level of each sensor, and the annotations of the remote operator, and the like, one of the three AVs may be selected, by the vehicle control system of the first AV, to be transmitted and merged with the global NAV map. The updated global NAV map can then be distributed to each AV of the fleet of AVs.

Having integrated the one or more local NAV map updates into the global NAV map, and having shared the updated global NAV map with the fleet of AVs, each AV of the fleet of AVs can learn how to handle the same, or similar, impediment, allowing the AV to proceed around the impediment under autonomous control.

In such instances, the vehicle can also use its own sensing technology to understand the current environment, much in the same way the original impediment was detected. Based upon any changes, detected by the plurality of vehicle sensors, in the current environment, the vehicle will react differently.

Initially, and as expected, if the vehicle control system, with the plurality of vehicle sensors, detects a similar environment or object to the environment or object circumnavigated previously by a remote operator, the AV will use the trajectory provided by, the remotely-operated AV for navigation and, therefore, will not need the support of the remote operator.

However, as suggested, there may be changes in the environment. For example, if the vehicle control system, with the plurality of vehicle sensors, do not detect the 'impediment' previously circumnavigated and as expected flour the local NAV map, the local NAV map can again be updated according to the process described above, or can be reverted to a previous version of the local NAV map, if appropriate. Moreover, similarly to the above, the updated local NAV map can be sent to the cloud-computing environment, integrated with the global NAV map, and distributed to the fleet of AVs for improved preparedness in navigation.

Figure 8:
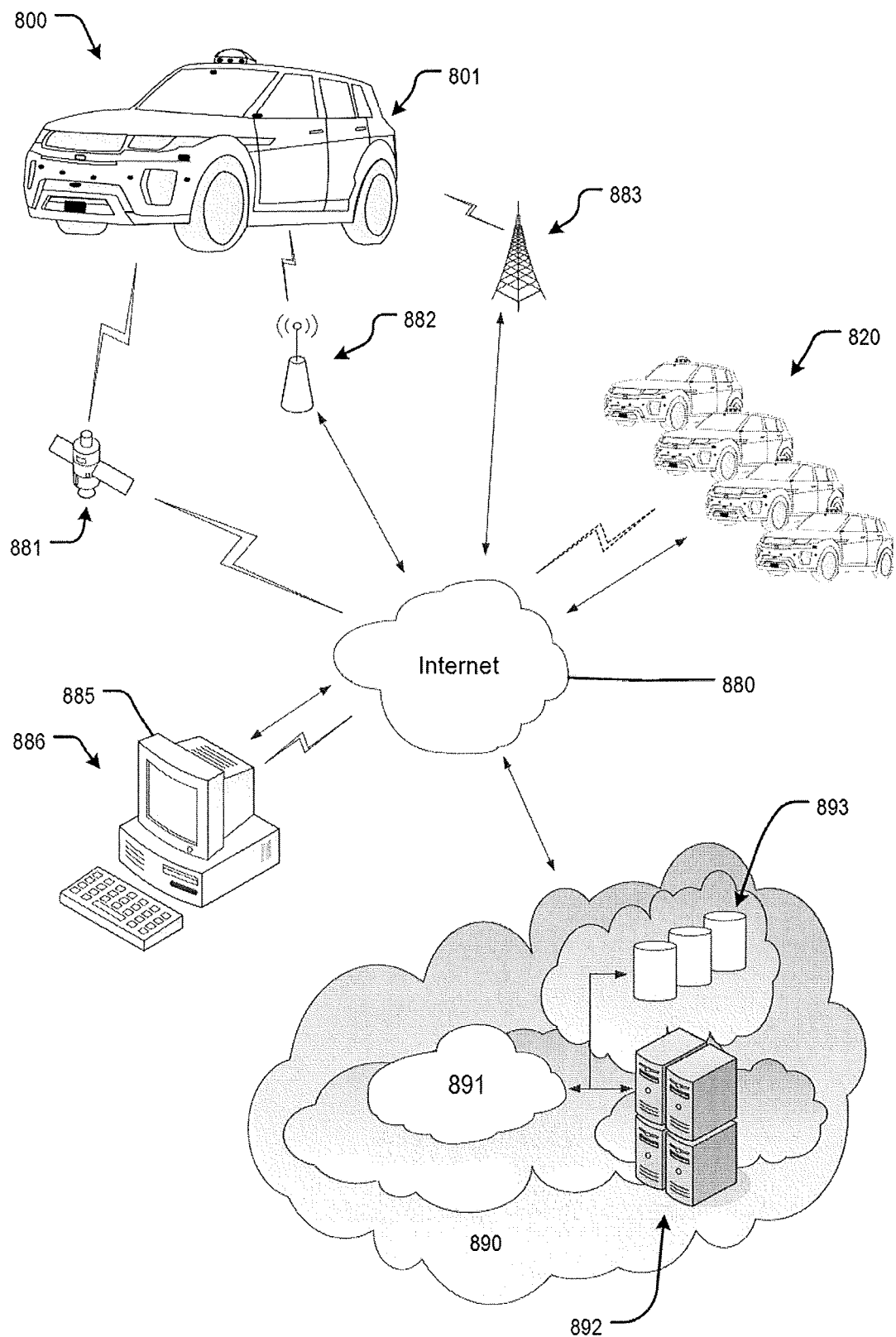
FIG. 8 is a schematic illustrating the communication architecture of a system for generation of and fleet distribution of local navigational map updates, according to an exemplary embodiment of the present disclosure.

FIG. 8 illustrates an exemplary Internet-based navigation system, wherein AVs are connected to a remote operator and to a cloud-computing environment via waypoints that are connected to the Internet.

According to an embodiment, an AV 800 having a vehicle control system 801 can connect to the Internet 880, via a wireless communication hub, through a wireless communication channel such as a base station 883 (e.g., an Edge, 3G, 4G, or LTE Network), an access point 882 (e.g., a femto cell or Wi-Fi network), or a satellite connection 881. Merely representative, each AV of a fleet of AVs 820 may similarly connect to the Internet 880 in order to upload and download updated NAV maps. In an example, a global NAV map can be stored in a data storage center 893 of a cloud-computing environment 890. A cloud-computing controller 891 in concert with a cloud-computing processing center 892 can permit uploading, storing, processing, and downloading of NAV maps from the data storage center 893. Updated local NAV maps can be transmitted to the cloud-computing environment 890 via the Internet 880 for integration within a global NAV map stored within the data storage center 893. The cloud-computing processing center 892 can be a computer cluster, a data center, a main frame computer, or a server farm. In one implementation, the cloud-computing processing center 892 and data storage center 893 are collocated.

In an embodiment, raw and/or processed information from a plurality of vehicle sensors can be transmitted to the cloud-computing environment 890 for processing by the cloud-computing processing center 892 and/or for storage in the data storage center 893. In the case of raw information, the cloud-computing processing center 892 can perform processing similar to that performed by the vehicle control system 801 of the AV 800 during AV operation. These processes include, among other processes, object identification and image classification.

According to an embodiment, a remote operator may perform annotation on a local NAV map at the level of the AV 800 or may perform annotation on a local NAV map at the level of the cloud-computing environment 890. To this end, a remote operator 886 can access the cloud-computing environment 890 through a remote control center 885 such as a desktop or laptop computer or workstation that is connected to the Internet 880 via a wired network connection or a wireless network connection.

Figure 9:
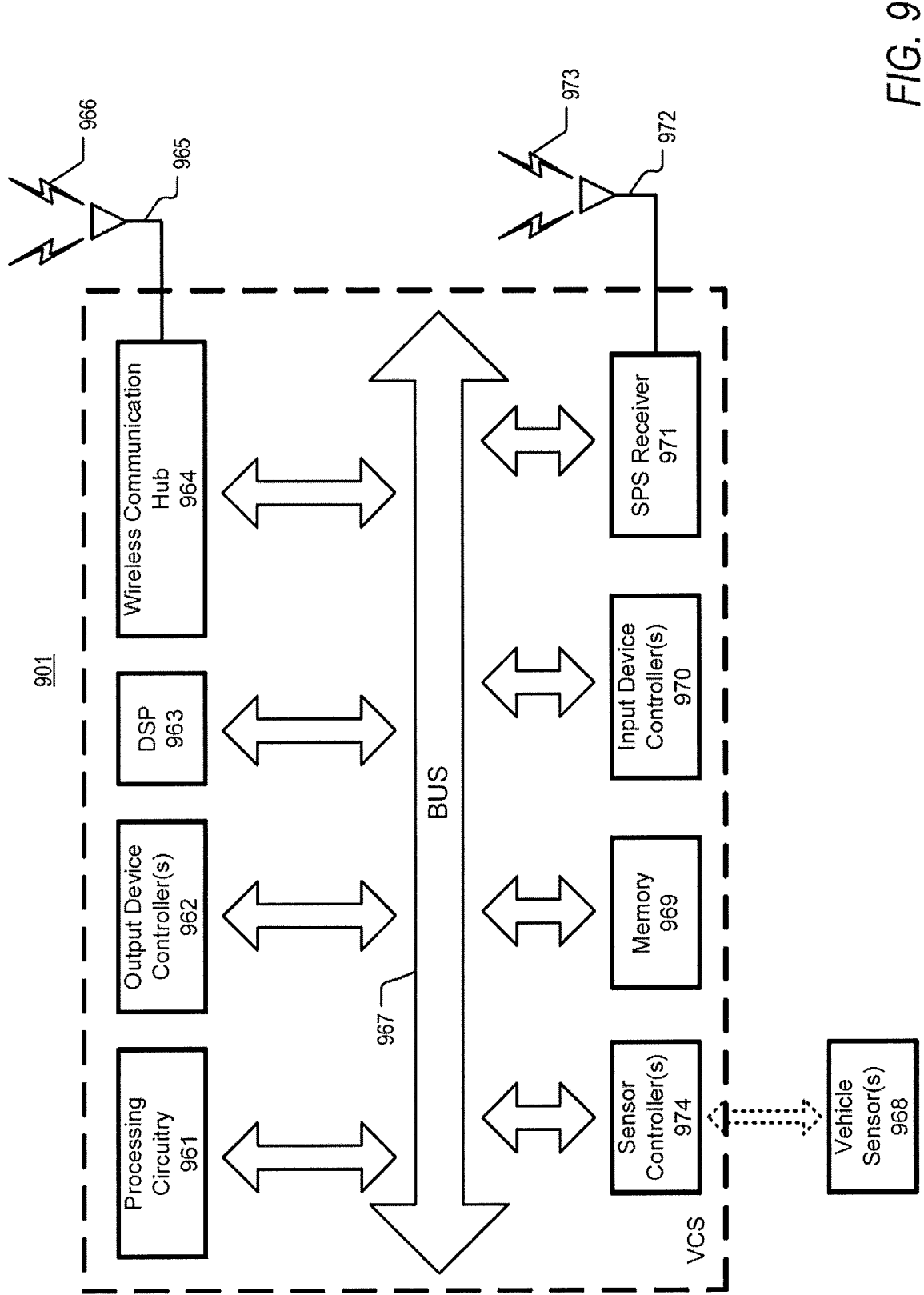
FIG. 9 is a block diagram of a vehicle control system, according to an exemplary embodiment of the present disclosure.

FIG. 9 is a block diagram of internal components of art example of a vehicle control system (VCS) that may be implemented, according to an embodiment. As discussed above, the VCS may be an electronics control unit (ECU). For instance, VCS 901 may represent an implementation of a telematics and GPS ECU or a video ECU. It should be noted that FIG. 9 is meant only to provide a generalized illustration of various components, any or all of which, may be utilized as appropriate. It can be noted that, in some instances, components illustrated by FIG. 9 can be localized to a single physical device and/or distributed among various networked devices, which may be disposed at different physical locations.

The VCS 901 is shown comprising hardware elements that can be electrically coupled via a BUS 967 (or may otherwise be in communication, as appropriate). The hardware elements may include processing circuitry 961 which can include without limitation one or more processors, one or more special-purpose processors (such as digital signal processing (DSP) chips, graphics acceleration processors, application specific integrated circuits (ASICs), and/or the like), and/or other processing structure or means. The above-described processors can be specially-programmed to perform operations including, among others, image processing and data processing. Some embodiments may have a separate DSP 963, depending on desired functionality. The VCS 901 also can include one or more input device controllers 970, which can control without limitation an in-vehicle touch screen, a touch pad, microphone, button(s), dial(s), switch(es), and/or the like. The VCS 901 can also include one or more output device controllers 962, which can control without limitation a display, light emitting diode (LED), speakers, and/or the like.

The VCS 901 might also include a wireless communication hub 964, which include without limitation a modem, a network card, an infrared communication device, a wireless communication device, and/or a chipset (such as a Bluetooth device, an IEEE 802.11 device, an IEEE 802.16.4 device, a WiFi device, a WiMax device, cellular communication facilities including 4G, 5G, etc.), and/or the like. The wireless communication hub 964 may permit data to be exchanged with, as described, in part, with reference to FIG. 8, a network, wireless access points, other computer systems, and/or any other electronic devices described herein. The communication can be carried out via one or more wireless communication antenna(s) 965 that send and/or receive wireless signals 966.

Depending on desired functionality, the wireless communication hub 964 can include separate transceivers to communicate with base transceiver stations (e.g., base stations of a cellular network) and/or access point(s). These different data networks can include various network types. Additionally, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on, including 4G and 5G technologies.

The VCS 901 can further include sensor controller(s) 974. Such controllers can control, without limitation, the plurality of vehicle sensors 968, including, among others, one or more accelerometer(s), gyroscope(s), camera(s), RADAR(s), LiDAR(s). Ultrasonic sensor(s), magnetometer(s), altimeter(s), microphone(s), proximity sensor(s), light sensor(s), and the like.

Embodiments of the VCS 901 may also include a Satellite Positioning System (SPS) receiver 971 capable of receiving signals 973 from one or more SPS satellites using an SPS antenna 972. The SPS receiver 971 can extract a position of the device, using conventional techniques, from satellites of an SPS system, such as a global navigation satellite system (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 971 can be used various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The VCS 901 may further include and/or be in communication with a memory 969. The memory 959 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 969 of the VCS 901 also can comprise software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods, thereby resulting in a special-purpose computer.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices nay be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A method for operating a vehicle, comprising identifying, by processing circuitry, an obstacle blocking at least a portion of a road based on data received from one or more vehicle sensors, determining, by the processing circuitry, whether a path trajectory cannot be found to operate the vehicle with respect to the identified obstacle while the vehicle is operating in autonomous mode, sending, by the processing circuitry and upon determination that the path trajectory cannot be found, a request to a remote controller to navigate the vehicle, operating, by the processing circuitry, the vehicle in remotely controlled mode, based upon instructions received from the remote controller, wherein a movement trajectory of the vehicle is recorded while being operated in the remotely controlled mode, and updating, by the processing circuitry, a navigational map based at least on the recorded movement trajectory.

(2) The method of (1), further comprising receiving, by the processing circuitry, additional information from the remote controller corresponding to the obstacle, and updating, by the processing circuitry, the navigational map with the received information.

(3) The method of either (1) or (2), wherein the additional information comprises annotation corresponding to the data received from the one or more vehicle sensors.

(4) The method of any of (1) to (3), further comprising sending, by the processing circuitry, at least one of the recorded movement trajectory and the data corresponding to the one or more vehicle sensors to a server to be shared with one or more other vehicles.

(5) The method of any of (1) to (4), further comprising recording, by the processing circuitry, the data from the one or more vehicle sensors while the vehicle is being operated in the-remotely controlled mode, and updating, by the processing circuitry, the navigational map with information corresponding to the recorded data from the one or more vehicle sensors.

(6) The method of any of (1) to (5), further comprising verifying by the processing circuitry and upon identifying the obstacle, whether a stored path trajectory corresponding to the obstacle exists in at least one of the navigational map or the server, generating, by the processing circuitry and whether the stored path trajectory exists, a new path trajectory for operation of the vehicle in autonomous mode based on the stored path trajectory, and operating, by the processing circuitry, the vehicle in autonomous mode using the new path trajectory.

(7) The method of any of (1) to (6), wherein the updated information on the navigational map expires after a first duration of time, wherein the first duration of time is determined based on information received from the remote controller.

(8) An apparatus, comprising processing circuitry configured to identify an obstacle blocking at least a portion of a road based on data received from one or more vehicle sensors, determine whether a path trajectory cannot be found to operate the vehicle with respect to the identified obstacle while the vehicle is operating in autonomous mode, send, upon determination that the path trajectory cannot be found, a request to a remote controller to navigate the vehicle, operate the vehicle in remotely controlled mode, based upon instructions received from the remote controller, wherein a movement trajectory of the vehicle is recorded while being operated in the remotely controlled mode, and update a navigational map based at least on the recorded movement trajectory.

(9) The apparatus of (8), wherein the processing circuitry is further configured to receive additional information from the remote controller corresponding to the obstacle, and update the navigational map with the received information.

(10) The apparatus of either (8) or (9), wherein the additional information comprises annotation corresponding to the data received from the one or more vehicle sensors.

(11) The apparatus of any of (8) to (10), wherein the processing circuitry is further configured to send at least one of the recorded movement trajectory and the data corresponding to the one or more vehicle sensors to a server to be shared with one or more other vehicles.

(12) The apparatus of any of (8) to (11), wherein the processing circuitry is further configured to record the data from the one or more vehicle sensors while the vehicle is being operated in the-remotely controlled mode, and update the navigational map with information corresponding to the recorded data from the one or more vehicle sensors.

(13) The apparatus of any of (8) to (12), wherein the processing circuitry is further configured to verify, and upon identifying the obstacle, whether a stored path trajectory corresponding to the obstacle exists in at least one of the navigational map or the server, generate, whether the stored path trajectory exists, a new path trajectory for operation of the vehicle in autonomous mode based on the stored path trajectory, and operating, by the processing circuitry, the vehicle in autonomous mode using the new path trajectory.

(14) The apparatus of any of (8) to (13), wherein the updated information on the navigational map expires after a first duration of time, wherein the first duration of time is determined based on information received from the remote controller.

(15) A non-transitory computer-readable storage medium storing computer-readable instructions that, when executed by a computer, cause the computer to perform a method, the method comprising identifying an obstacle blocking at least a portion of a road based on data received from one or more vehicle sensors, determining whether a path trajectory cannot be found to operate the vehicle with respect to the identified obstacle while the vehicle is operating in autonomous mode, sending, upon determination that the path trajectory cannot be found, a request to a remote controller to navigate the vehicle, operating the vehicle in remotely controlled mode, based upon instructions received from the remote controller, wherein a movement trajectory of the vehicle is recorded while being operated in the remotely controlled mode, and updating a navigational map based at least on the recorded movement trajectory.

(16) The computer-readable storage medium of (15), further comprising receiving additional information from the remote controller corresponding to the obstacle, and updating the navigational map with the received information.

(17) The computer-readable storage medium of either (15) or (16), further comprising sending at least one of the recorded movement trajectory and the data corresponding to the one or more vehicle sensors to a server to be shared with one or more other vehicles.

(18) The computer-readable storage medium of any of (15) to (17), further comprising recording the data from the one or more vehicle sensors while the vehicle is being operated in the-remotely controlled mode, and updating the navigational map with information corresponding to the recorded data from the one or more vehicle sensors.

(19) The computer-readable storage medium of any of (15) to (18), further comprising verifying, upon identifying the obstacle, whether a stored path trajectory corresponding to the obstacle exists in at least one of the navigational map or the server, generating, whether the stored path trajectory exists, a new path trajectory for operation of the vehicle in autonomous mode based on the stored path trajectory, and operating the vehicle in autonomous mode using the new path trajectory.

(20) The computer-readable storage medium of any of (15) to (19), wherein the updated information on the navigational map expires after a first duration of time, wherein the first duration of time is determined based on information received from the remote controller.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:
1. A method for operating a vehicle, comprising:
identifying, by processing circuitry, an obstacle blocking at least a portion of a road based on data received from one or more vehicle sensors;
determining, by the processing circuitry, whether a path trajectory cannot be found to operate the vehicle with respect to the identified obstacle while the vehicle is operating in autonomous mode;
sending, by the processing circuitry and upon determining that the path trajectory cannot be found, a request to a remote controller to navigate the vehicle;
operating, by the processing circuitry, the vehicle in a remotely controlled mode according to instructions received from the remote controller, a movement trajectory of the vehicle being recorded while the vehicle is operated, according to the received instructions, in the remotely controlled mode; and updating, by the processing circuitry, a navigational map based at least on the recorded movement trajectory of the vehicle recorded during operation in the remotely controlled mode.

2. The method of claim 1, further comprising:
receiving, by the processing circuitry, additional information from the remote controller corresponding to the obstacle; and
updating, by the processing circuitry, the navigational map with the received information.

3. The method of claim 2, wherein the received additional information comprises annotation corresponding to the data received from the one or more vehicle sensors.

4. The method of claim 1, further comprising:
sending, by the processing circuitry, at least one of the recorded movement trajectory and corresponding data received from the one or more vehicle sensors to a server to be shared with one or more other vehicles.

5. The method of claim 1, further comprising:
recording, by the processing circuitry, data received from the one or more vehicle sensors while the vehicle is being operated in the remotely controlled mode; and
updating, by the processing circuitry, the navigational map with information corresponding to the recorded data received from the one or more vehicle sensors.

6. The method of claim 1, further comprising:
verifying, by the processing circuitry and upon identifying the obstacle, whether a stored path trajectory corresponding to the identified obstacle exists in at least one of the navigational map or a server;
generating, by the processing circuitry and when the stored path trajectory corresponding to the identified obstacle exists, a new path trajectory for operating the vehicle in the autonomous mode based on the stored path trajectory; and
operating, by the processing circuitry, the vehicle in the autonomous mode using the new path trajectory.

7. The method of claim 1, wherein updated information on the navigational map expires after a first duration of time, the first duration of time determined based on information received from the remote controller.

8. An apparatus, comprising:
processing circuitry configured to
identify an obstacle blocking at least a portion of a road based on data received from one or more vehicle sensors,
determine whether a path trajectory cannot be found to operate the vehicle with respect to the identified obstacle while the vehicle is operating in autonomous mode,
send, upon determining that the path trajectory cannot be found, a request to a remote controller to navigate the vehicle,
operate the vehicle in remotely controlled mode according to instructions received from the remote controller, a movement trajectory of the vehicle being recorded while the vehicle is operated, according to the received instructions, in the remotely controlled mode, and
update a navigational map based at least on the recorded movement trajectory pf the vehicle recorded during operation in the remotely controlled mode.

9. The apparatus of claim 8, wherein the processing circuitry is further configured to
receive additional information from the remote controller corresponding to the obstacle, and
update the navigational map with the received information.

10. The apparatus of claim 9, wherein the received additional information comprises annotation corresponding to the data received from the one or more vehicle sensors.

11. The apparatus of claim 8, wherein the processing circuitry is further configured to
send at least one of the recorded movement trajectory and corresponding data received from the one or more vehicle sensors to a server to be shared with one or more other vehicles.

12. The apparatus of claim 8, wherein the processing circuitry is further configured to
record data received from the one or more vehicle sensors while the vehicle is being operated in the remotely controlled mode, and
update the navigational map with information corresponding to the recorded data received from the one or more vehicle sensors.

13. The apparatus of claim 8, wherein the processing circuitry is further configured to
verify, and upon identifying the obstacle, whether a stored path trajectory corresponding to the identified obstacle exists in at least one of the navigational map or a server,
generate, when the stored path trajectory corresponding to the identified obstacle exists, a new path trajectory for operating the vehicle in the autonomous mode based on the stored path trajectory, and
operating, by the processing circuitry, the vehicle in the autonomous mode using the new path trajectory.

14. The apparatus of claim 8, wherein updated information on the navigational map expires after a first duration of time, the first duration of time bin determined based on information received from the remote controller.

15. A non-transitory computer-readable storage medium storing computer-readable instructions that, when executed by a computer, cause the computer to perform a method, the method comprising:
identifying an obstacle blocking at least a portion of a road based on data received from one or more vehicle sensors;
determining whether a path trajectory cannot be found to operate the vehicle with respect to the identified obstacle while the vehicle is operating in autonomous mode;
sending, upon determining that the path trajectory cannot be found, a request to a remote controller to navigate the vehicle;
operating the vehicle in remotely controlled mode according to instructions received from the remote controller, a movement trajectory of the vehicle being recorded while the vehicle is operated, according to the received instructions, in the remotely controlled mode; and
updating a navigational map based at least on the recorded movement trajectory of the vehicle recorded during operation in the remotely controlled mode.

16. The computer-readable storage medium of claim 15, further comprising:
receiving additional information from the remote controller corresponding to the obstacle; and
updating the navigational map with the received information.

17. The computer-readable storage medium of claim 15, further comprising:

sending at least one of the recorded movement trajectory and corresponding data received from the one or more vehicle sensors to a server to be shared with one or more other vehicles.

18. The computer-readable storage medium of claim 15, further comprising:
recording data received from the one or more vehicle sensors while the vehicle is being operated in the remotely controlled mode; and
updating the navigational map with information corresponding to the recorded data received from the one or more vehicle sensors.

19. The computer-readable storage medium of claim 15, further comprising:
verifying, upon identifying the obstacle, whether a stored path trajectory corresponding to the identified obstacle exists in at least one of the navigational map or a server;
generating, when the stored path trajectory corresponding to the identified obstacle exists, a new path trajectory for operating the vehicle in the autonomous mode based on the stored path trajectory; and
operating the vehicle in the autonomous mode using the new path trajectory.

20. The computer-readable storage medium of claim 15, wherein updated information on the navigational map expires after a first duration of time, the first duration of time being determined based on information received from the remote controller.

* * * * *